Aug. 1, 1944.  A. M. MARKS  2,354,692
FILM SHAPING AND LAMINATING DEVICE
Filed Jan. 21, 1941  2 Sheets-Sheet 1

INVENTOR
Alvin M. Marks
BY Orville N Greene
ATTORNEY

Aug. 1, 1944.                A. M. MARKS                2,354,692
                  FILM SHAPING AND LAMINATING DEVICE
                       Filed Jan. 21, 1941        2 Sheets-Sheet 2
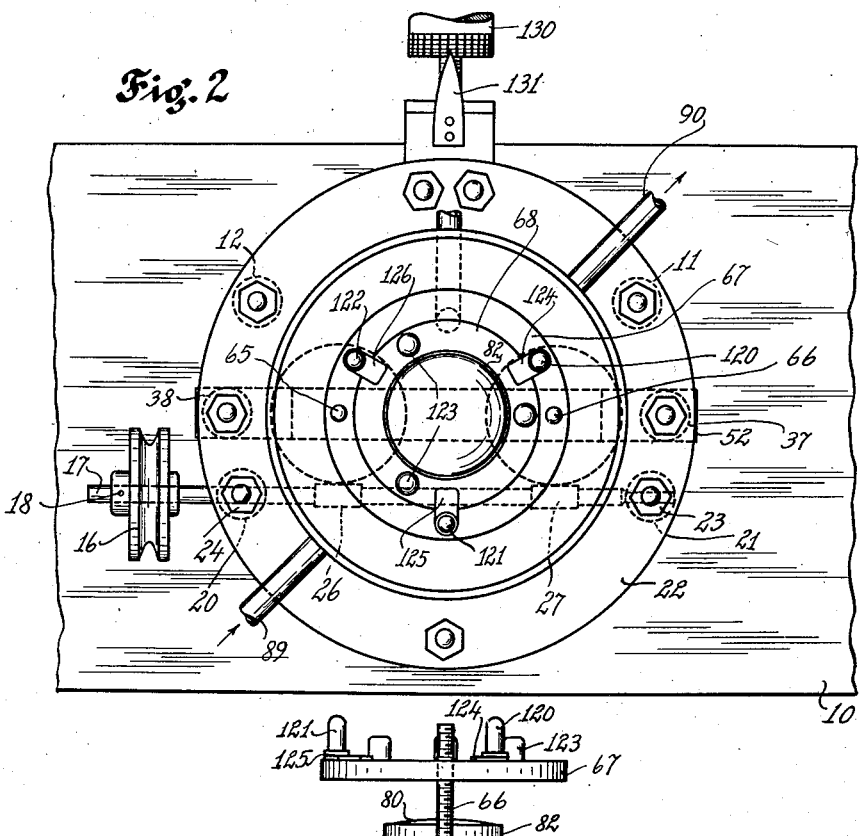
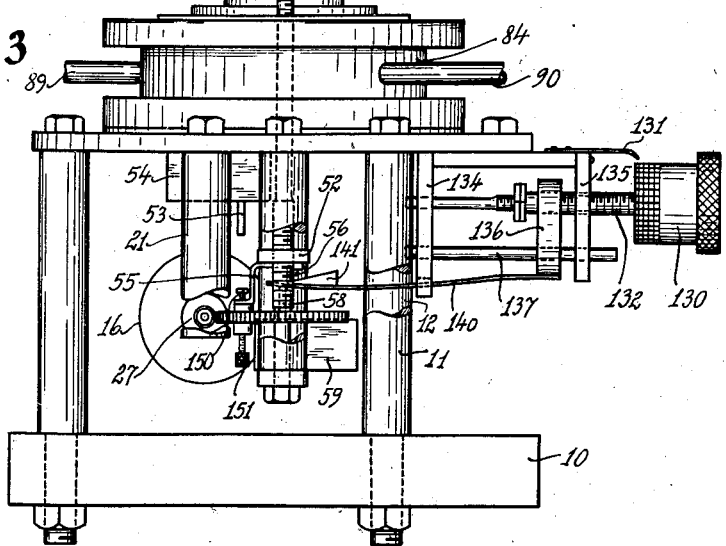
INVENTOR
Alvin M. Marks
BY Orville N. Greene
ATTORNEY.

Patented Aug. 1, 1944

2,354,692

UNITED STATES PATENT OFFICE 2,354,692

FILM SHAPING AND LAMINATING DEVICE

Alvin M. Marks, Whitestone, Long Island, N. Y.

Application January 21, 1941, Serial No. 375,151

10 Claims. (Cl. 154—1)

My invention relates to a toric expander and more particularly my invention relates to a novel apparatus and method for expanding and shaping a plastic film containing a crystalline layer. This application is a continuation in part of my co-pending application Serial No. 313,392, for Polarizing crystalline formation by transfer and expansion, filed January 11, 1940, in which I have disclosed a method for forming a crystalline layer on a plastic film, and an apparatus and method for expanding the same. For certain purposes such as, for example, in the formation of polarized toric lenses, it is necessary that the plastic film carrying the polarizing crystalline layer be shaped to a toric shape and laminated between two toric lenses. This shaping, expanding and lamination I prefer to carry out under special conditions including vacuum, tension, pressure and heat.

I have devised a novel apparatus by means of which I may thus expand and shape a plastic film carrying a crystalline layer and by means of this apparatus I may employ the toric lens to which the plastic film is to be laminated as the shaping means.

I further provide means for uniformly and with equally exerted tension and pressure simultaneously expand and shape the plastic film carrying a crystalline layer over said toric lens. I also provide for laminating a second toric lens over the plastic film which has been shaped and expanded about the first toric lens.

A further feature of my invention lies in certain means which I provide for controlling the movement of my expansion apparatus to certain predetermined limits.

It is the object of my invention to provide a novel expanding and laminating apparatus and method.

It is a further object of my invention to provide a novel expander for imparting a toric shape to the plastic medium.

It is a further object of my invention to provide a novel toric expander for a plastic film carrying a crystalline layer or field.

It is a further object of my invention to provide a novel apparatus by means of which the plastic film is drawn down over a shaping medium which shaping medium forms a portion of the finished product of my invention.

It is a further object of my invention to provide a novel means for expanding and shaping a plastic film over a toric lens in combination with means for laminating a second toric lens over the expanded and shaped plastic film.

It is a further object of my invention to provide a toric expanding apparatus in which a ring member carrying a plastic film is caused to move downwardly over a shaping medium so that the plastic film carried by the ring is expanded and shaped by the shaping medium.

It is a further object of my invention to provide an expander apparatus in which the vertical movement of the travelling gripping ring is governed by predetermined sensitive snap switches.

Further objects of my invention will be apparent from a consideration of the drawings and the specific description thereof which here follows:

In Figure 1 I show a side view and partial cross section of the toric expander of my invention.

In Figure 2 I show a plan view of the apparatus of my invention with the vacuum hood removed therefrom.

Figure 3 is a side view of the apparatus of my invention taken in a plane normal to the view of Figure 1.

Figure 1:
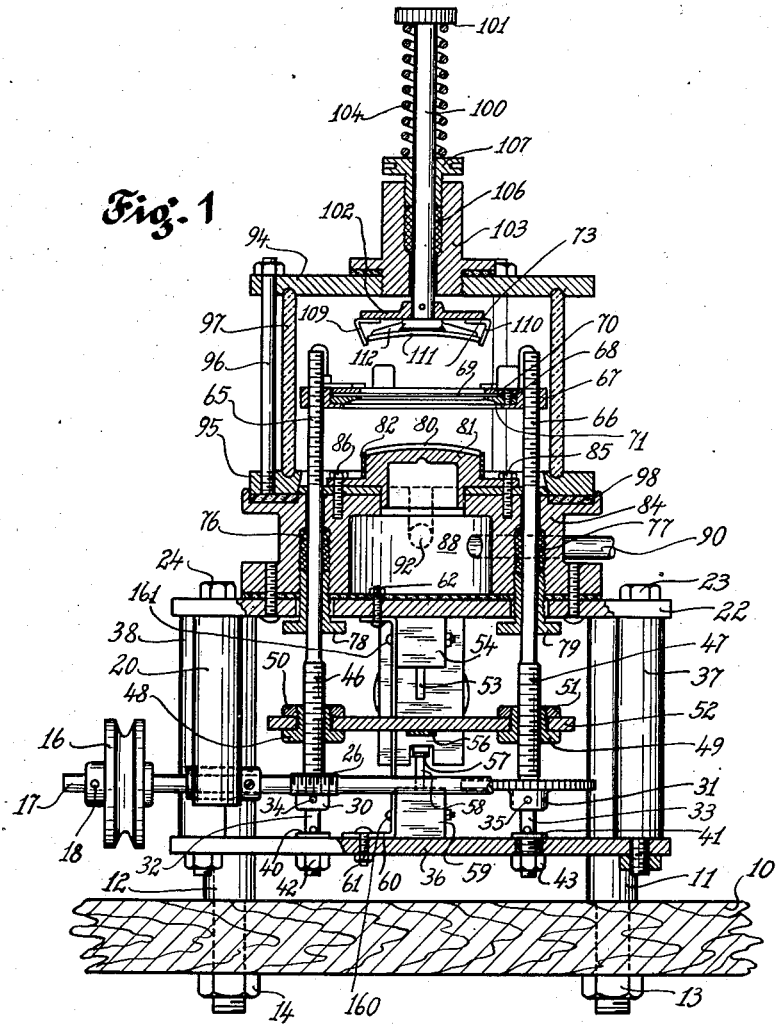

Referring now more specifically to the drawings, in Figure 1 I show rising from a suitable support 10, posts 11 and 12 which act as the supporting frame for my apparatus. Supporting posts 11 and 12 are secured to the support 10 by means of suitable nuts 13 and 14.

A pulley 16 locked on to a shaft 17 by the pin 18 is adapted to be rotated by a pulley and suitable motor source of power not shown. Shaft 17 is mounted in supporting posts 20 and 21 (see Figure 2) which are affixed to an upper frame plate 22 by suitable securing means 23 and 24. Affixed on the shaft 17 are worms 26 and 27 (see also Figure 3) which are adapted to engage worm gears 30 and 31 pinned to shafts 32 and 33 by pins 34 and 35. The shafts 32 and 33 are vertically and rotatably mounted in the lower frame plate 36 which is supported by the supporting posts 37 and 38. Washers 40 and 41 and nuts 42 and 43 maintain these shafts 32 and 33 against the vertical movement with respect to the supporting plate 36. Shafts 32 and 33 have a screw thread formation at 46 and 47 and in engagement with this screw thread formation 46—47 by means of the screw thread bearings 48 and 49 and locking-nuts 50 and 51 is limiting plate 52 which moves upwardly or downwardly depending upon the direction of rotation of the screw thread areas 46 and 47 of the shaft 32 and 33.

Upon upward movement of the upper limiting plate contact is effected by the limiting plate with the pin 53 of the sensitive snap switch 54. Upon downward movement of the limiting plate 52 contact is effected between stud 56 mounted on the limiting plate 52 and the wedge member 57 which in turn contacts the pin 58 of the sensitive snap switch 59. Snap switches 54 and 59 are secured on a supporting plate 60 by bolts 160 and 161 respectively. Plate 60 is secured by the bolt and nut 61 to the lower supporting plate 36 and secured by the nut and bolt 62 to the upper supporting plate 22.

The upper portions of the shafts 32 and 33 also have screw thread areas 65 and 66 and in screw thread engagement with these screw thread areas 65 and 66 is a ring 67 having threaded openings. Into the ring 67 is set and secured a split ring 68 adapted to carry a plastic film 69 which carries a crystalline layer, such as of polarizing crystal. The ring 68 is a split ring comprising two parts, namely an upper part 70 and a lower part 71. Inasmuch as the operating chamber 73 is to be evacuated, the intermediate length of the shafts 32 and 33 pass through packing chambers 76 and 77 and the packings may be adjusted by the packing glands 78 and 79. A shaping member, such as a toric lens 80, is set on a seat 81 and ring 82 fits around the outer edge of the seat 81 to hold the lens 80 in place. Seat 81 is hollow and is secured to block 84 by suitable securing bolts 85 and 86. The block 84 is also hollow being provided with a heating chamber 88 into which is fed a heating fluid such as hot water or steam through a supply pipe 89, a similar pipe 90 being provided as shown in Figure 2 for withdrawing the heated fluid from the chamber to provide circulation thereof. A vacuum pipe 92 enters the chamber 73 as shown in dotted line and the vacuum pipe is connected with a suitable means for evacuation such as a vacuum pump 211 shown diagrammatically in Figure 4. To provide a hermetically sealed vacuum chamber, a vacuum hood comprising an upper plate 94, a lower ring-plate 95 secured together by bolts, such as 96, and a transparent cylindrical wall 97, is seated on the gasket 98 which is set in a suitable gasket receiving seat formed in the block 84.

A plunger 100 having impelling head 101 and operating head 102 is slidably mounted in the bearing 103 and resiliently held in a normally retracted position by the spring 104. A packing chamber 106 which may be adjusted by the packing gland 107 assures an air tight seal for the sliding plunger 100. Affixed to the operating head 102 are spring members 109 and 110 which are adapted to hold a lens 111 against a pressure head 112 which is fixed to the operating head 102.

By referring to Figure 2 the operation of the vertically moving ring 67 becomes more clearly apparent. Ring 67 carries equi-laterally mounted thereon pins 120, 121 and 122 which carry pivoted retaining plates 124, 125 and 126. These plates are adapted to engage the split ring 68 which carries the plastic film firmly mounted therein. Also shown here is the micrometer 130 and indicator 131 which permit adjustment of the limit of the downward movement of limiting plate 52 and hence also of the film expander ring 68. This adjustment will be more fully apparent from a consideration of Figure 3.

In Figure 3 it will be noted that the micrometer 130 is mounted on a screw threaded rod shaft 132 and is adapted to be rotated by the operator of the apparatus. The shaft 132 is rotatably mounted in the plate 134 and is mounted in a threaded hole in the support 135. In fixed rotatable engagement with the shaft 132 is a riding member 136 which is adapted to be moved laterally by the rotation of the micrometer 130. For guiding its movement riding member 136 is mounted on a rod 137 which is supported by and may slide through holes in the plate 134 and the support 135. Affixed to the bottom of the riding member 136 is a spring extension 140 which carries at its extremity a wedge member 141. The wedge member 141 has the function of lessening the path of downward movement of the limiting plate 52 since the pressure thereupon by the stud 56 fixed on the plate 52 causes the wedge member to engage the pin 58 of the snap switch 59. Retraction of the wedge, as will be more clearly apparent from a detailed description hereinafter, lengthens the path of downward travel of the limiting plate 52. To provide for an adjustment of the upward path of the limiting plate 152 with regard to the limiting snap switch 54, I secure an extension member 55 to the limiting plate 52, the extension member being provided with a contact 150 for exerting pressure on the sensitive snap switch pin 53. Contact 150 is adjustable with regard to its height by the adjusting screw 151.

The operation of my apparatus is as follows:
A toric lens 80 is set in the seat member 81 and retained in position by the retaining ring member 82. This lens may, for example, be a toric lens adapted to be a component element of a toric laminated lens for spectacles. Alternatively 80 may represent any suitable shaping member adapted to impart the desired shape to a moldable film which may carry a crystalline layer. A plastic film 69 carrying a crystalline layer formed, for example, as described in my co-pending application Serial No. 313,392 is secured between the two elements 70 and 71 of the split ring 68. The two elements 70 and 71 are secured together as shown in Figure 2 by securing means 123. The split ring carrying the tautly held plastic film 69 is then set in the ring member 67 and the pivoted retaining plates 124, 125 and 126 are swung into position so as to lock the ring 68 firmly in position. If a laminated toric lens is to be made a lens 111 is mounted on the operating head 102 of the plunger 100 by the spring retaining members 109 and 110. The vacuum hood 94 is then placed in position on the gasket 98 so that an air tight seal is obtained therewith. The operating chamber 73 is evacuated by means of the vacuum pipe 92 and simultaneously a heated fluid is circulated through the hollow chamber 88 by means of the supply pipes 89 and 90. A reversible motor 200 then causes the rotation of the pulley 16 which in turn rotates shaft 17 and the worms 26 and 27 mounted thereon. Worms 26 and 27 engage and rotate the cooperating worm gears 30 and 31. Rotation of the worm gears 30 and 31 causes the rotation of the vertical rods 32 and 33 to which these worm gears are affixed. The rotation of the vertical rods 32 and 33, if the rotation is in a right hand direction, causes the lowering of both the limiting plate 52 and the ring 67 which are mounted in screw thread engagement with the screw thread areas of these rods.

Retaining ring 67 carrying with it the split ring 68 in which is fixed the plastic film 69 then moves downwardly and is drawn over the shaping lens 80. The equally distributed pressure exerted upon the plastic film 69 causes the film and the crystalline layer thereon to be expanded and shaped over the lens 80. In the meantime the limiting plate 52 has moved down a corresponding distance and at the proper predetermined point the stud 56 on the underside of the limiting plate 52 contacts the wedge 141 causing the wedge 141 in turn to press against pin 58 of the sensitive snap switch 59.

The actuation of the snap switch 59 stops the power source which rotates the pulley 16. The reversal of the motor is effected by the operator after lamination of the upper lens by reversing the switch to position 117 (Figure 4), whereupon the limiting plate 52 and the ring 67 move upwardly to return to original position. When the original predetermined position is reached the limiting plate 52 presses against the pin 53 of the snap switch 54 to cause the motor to stop. The apparatus is then ready for opening and reuse.

Figure 4:
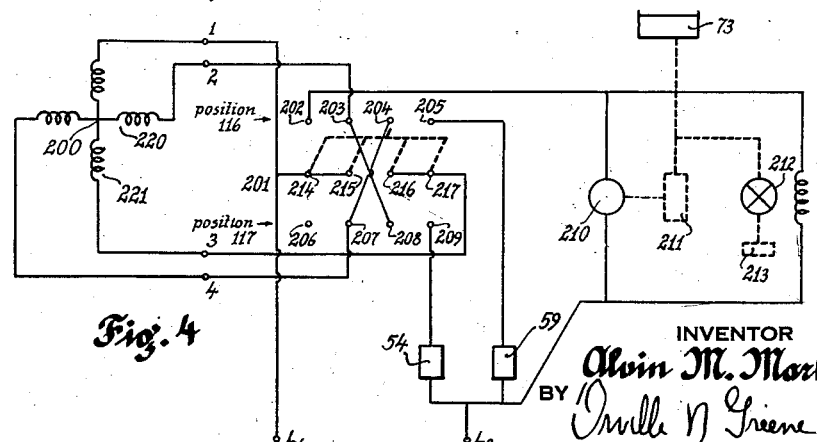
Figure 4 is a diagrammatic layout of the reversing electrical circuit.

In Figure 4 I show the basic circuit by means of which I control the various operations of my apparatus. A reversible motor 200 is energized in such a manner as to cause the worms 26 and 27 to effect such rotation of screws 65 and 66 to cause the downward movement of the film 69 in the ring 67 by contacting the blades 215, 216 and 217, respectively, with the contacts 203, 204 and 205. The simultaneous contacting of the knife blade switch 214 with the contact 202 further effects the actuation of the motor 210 which actuates the vacuum pump 211 and this effects the evacuation of the operating chamber 73.

Simultaneously, as will be seen by the circuit, the solenoid air valve 212 is closed so that the operating chamber 73 is sealed from the surrounding atmosphere. Upon the closing of these same contacts, the current is fed to the motor by the sensitive snap switch 59 successively via a path through contacts 205, 217, 216 and 204. Accordingly, the opening of snap switch 59 opens the circuit stopping the motor 200 and thus limiting the downward motion of the ring 67.

Upon completion of the necessary downward motion to effect the expansion and lamination of the film 69 with the lens 80, the operator next manually, or by a suitable mechanism, presses down upon the pressure pad 101, thus causing lens 11 to laminate itself to the upper surface of the expanded plastic film 69. Plastic film 69 which may for example comprise cellulose derivatives such as cellulose acetate or any suitable plastic material is preliminarily treated with a bonding agent which may for example comprise a high boiling point, low vapor pressure plasticizer, such as dioctylphthalate which makes possible an intimate bond between the laminated parts. This plastic film 69 may, and for the particular purposes of my invention, does comprise a plastic film carrying a polarizing layer or film deposited thereupon in some suitable manner such as, for example, described in my copending application Serial No. 313,292.

After suitable pressure has been applied upon the pressure plunger 100 by the operator, the said plunger is released, spring fingers 109, and 110 disengaging from the cover lens 11 which remains firmly bonded and in contact with the plastic film 69, the holder 102 being retracted to its original position by the spring 104. When the lamination operation has been thus completed the operator reverses the knife blades 214, 215 and 216 and 217 to make contact with the contacts 206, 207, 208 and 209. This causes motor 200 to reverse inasmuch as the current through coil 220 reverses direction while current through coil 221 continues in the same direction. The reversal of the motor causes the upward motion of the ring 67 together with the laminated lens bonded to the film 69 held by the ring 67, the upward motion being now limited by sensitive snap switch 54 through which the current supplying the motor 200 must travel to reach the line L—2.

Simultaneously with the reversal of the knife switch, vacuum pump motor 210 and air valve 211 are de-energized thus stopping the vacuum pump 211 and opening the vent to the atmosphere through air valve 212 and air filter 213, thus equalizing the pressure in chamber 73 with the atmospheric pressure.

When the the ring 67 has reached the proper point in its path of upward travel, the limiting plate 52 contacts the pin 53 and sensitive snap switch 54, which in turn shuts off the current to the motor, stopping the motor and stopping the movement of the ring 67. Since the pressure in the operating chamber 73 has been equalized, the vacuum hood 94 may now be removed from contact with the gasket 98 and the inner ring 68 is then disengaged from the outer ring 67 by pivoting the holder plates 124, 125 and 126. The split ring 68 is then disassembled and the excess plastic trimmed away from the periphery of the lamination.

Lenses 80 and 111 may be coated, if desired, on their inner contacting surfaces in some suitable manner with appropriate adhesive compounds before being placed in their position for the lamination operation.

Adhesives such as resins of the vinyl family or esters of the acrylic or methacrylic acids may be employed.

I claim:

1. A shaping apparatus comprising in combination means for holding a film to be shaped, said means comprising a ring, means for removably gripping said ring, said means comprising a retaining ring, said retaining ring being mounted on screw threaded rods, a toric shaping member, means for rotating said rods to cause said retaining ring to move down over said toric shaping member.

2. A shaping apparatus comprising in combination means for holding a film to be shaped, said means comprising a ring, means for removably gripping said ring, said means comprising a retaining ring, said retaining ring being mounted on screw threaded rods, a toric shaping member, means for rotating said rods to cause said retaining ring to move down over said toric shaping member, and means for reversing the movement of said screw threaded rods to cause the retaining ring to move upwardly.

3. A shaping apparatus comprising in combination means for holding a film to be shaped, said means comprising a ring, means for removably gripping said ring, said means comprising a retaining ring, said retaining ring being mounted on screw threaded rods, a shaping member, means for rotating said rods to cause said retaining ring to move down over said shaping member, means for reversing the movement of said screw threaded rods to cause the retaining ring to move upwardly, and means for limiting the movement of said retaining ring.

4. A shaping apparatus comprising in combination means for holding a film to be shaped, said means comprising a ring, means for removably gripping said ring, said means comprising a retaining ring, said retaining ring being mounted on screw threaded rods, a toric shaping member, means for heating said shaping member, means for rotating said rods to cause said retaining ring to move down over said toric shaping member so that said film is drawn tightly over said shaping member, and means for laminating an element over said film, said means for laminating being positioned so that the lamination is effected while the film is drawn tightly over said shaping member.

5. A shaping apparatus comprising in combination means for holding a film to be shaped, said means comprising a ring, means for removably gripping said ring, said means comprising a retaining ring, said retaining ring being mounted on screw threaded rods, a shaping member, means for heating said shaping member, means for rotating said rods to cause said retaining ring to move down over said shaping member so that said film is drawn tightly over said shaping member, and means for laminating an element over said film, said means comprising a retractable plunger having a member for releasably holding said element, said means for laminating being positioned so that the lamination is effected while the film is drawn tightly over said shaping member.

6. A shaping apparatus comprising in combination means for holding a film to be shaped, said means comprising a ring, means for removably gripping said ring, said means comprising a retaining ring, said retaining ring being mounted on screw threaded rods, a shaping member, means for heating said shaping member, means for rotating said rods to cause said retaining ring to move down over said shaping member so that said film is drawn tightly over said shaping member, means for laminating an element over said film, said means for laminating being positioned so that the lamination is effected while the film is drawn tightly over said shaping member, and means for establishing an evacuated operating chamber over said ring and said shaping member.

7. A shaping apparatus comprising in combination means for holding a film to be shaped and a toric shaping member, means for establishing reduced pressure conditions over said means for holding the film to be shaped and said toric shaping member, means for bringing said film into pressure contact with said toric shaping member, means for heating said toric shaping member, and means for laminating an element to said film.

8. A shaping apparatus comprising in combination means for holding a film to be shaped and a toric shaping member, said toric shaping member comprising a first element adapted to be laminated to said film, means for establishing reduced pressure conditions over said means for holding the film to be shaped and said toric shaping member, means for bringing said film into pressure contact with said toric shaping member, means for heating said toric shaping member, and means for laminating a second element to said film.

9. A shaping apparatus comprising in combination means for holding a film to be shaped, said means comprising a split ring adapted to firmly grip said film, means for removably gripping said split ring, said means comprising a retaining ring, said retaining ring being mounted on screw threaded rods and being adapted to be moved upwardly or downwardly by the proper rotation of said screw threaded rods, means for rotating said rods, a shaping member, a seat for positioning said shaping member, means for gripping an element adapted to be contacted with said film, means for pressing said element into contact with said film after said film has been drawn and shaped over said shaping member and while said film is still in drawn condition, and means for establishing reduced pressure conditions in said apparatus.

10. A shaping apparatus comprising in combination means for holding a film to be shaped, said means comprising a split ring adapted to firmly grip said film, means for removably gripping said split ring, said means comprising a retaining ring, said retaining ring being mounted on screw threaded rods and being adapted to be moved upwardly or downwardly by the proper rotation of said screw threaded rods, means for rotating said rods, a shaping member, a seat for positioning said shaping member, means for gripping an element adapted to be contacted with said film, means for pressing said element into contact with said film after said film has been drawn and shaped over said shaping member and while said film is still in drawn condition, means for establishing reduced pressure conditions in said apparatus, and means for limiting the upward movement of said retaining ring and means for limiting the downward movement of said retaining ring.

ALVIN M. MARKS.